G. M. EVANS.
Seed-Planter.
No. 25,889.
Patented Oct. 25, 1859.
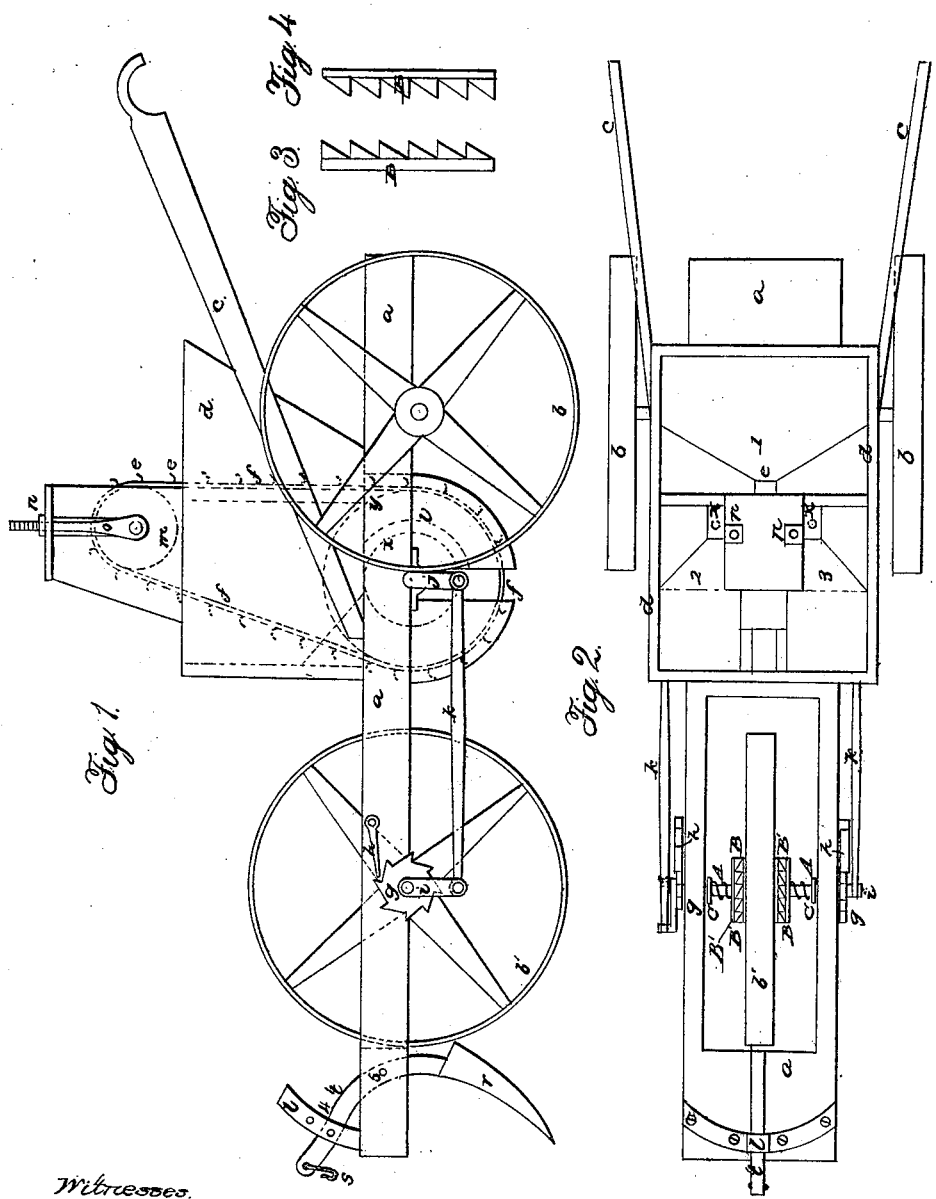

UNITED STATES PATENT OFFICE.

GEORGE M. EVANS, OF PITTSBURG, PENNSYLVANIA.

IMPROVEMENT IN SEED-PLANTERS.

Specification forming part of Letters Patent No. 25,889, dated October 25, 1859.

*To all whom it may concern:*

Be it known that I, GEORGE M. EVANS, of the city of Pittsburg, in the county of Allegheny and State of Pennsylvania, have invented a new and useful Improvement in Seed-Planters; and I do hereby declare that the following is a full and exact description thereof, reference being had to the accompanying drawings, and to the letters of reference marked thereon, similar letters referring to similar parts.

The nature of my invention consists in the combination and arrangement of ratchets, ratchet-wheels, springs, cranks, and connecting-rods with hoppers, seed-drums, pulleys, endless conveyer, and plow, the whole being combined, arranged, and constructed in the manner hereinafter described.

To enable others skilled in the art to make and use my invention, I will proceed to describe its construction and operation.

In the accompanying drawings, Figure 1 is a side view of the planter. Fig. 2 is a top view of the planter. Figs. 3 and 4 are edge views of the ratchet-wheels.

$a$ is the frame of the planter. $b$ and $b'$ are the wheels which support the frame $a$ and the parts attached thereto. $e$ are cups or elevators secured to the belt $f$. $g$ are the ratchet-wheels. $h$ are the pawls. The cranks $i$ are secured to the shaft of the wheel $b'$, and the cranks $j$ are secured to the shaft or axle of the drums $x$ and pulley $y$. $k$ are the connecting-rods, which connect with the cranks $i$ and $j$, thereby uniting the action of the seed-drums $x$, pulleys $y$ and $m$, and the endless conveyer with the action of wheel $b'$. $r$ is the plow. $t$ is the plow-beam. $l$ is the beam-yoke, which is used in connection with the bolt marked 4 for regulating the depth of the cut of the plow and for holding the plow and beam firm. $s$ is the clevis or draft-hook. The whole of the strain of the plow $r$ and beam $t$ is thrown on the bolts 4 and 5. $o$ are hangers, which are raised or lowered by means of the nuts $u$. The axle of pulley $m$ has its bearings in the hangers $o$. By this arrangement the endless conveyer or belt $f$ can be tightened up at pleasure.

The seed-drums are represented by dotted lines, marked $x$. These drums are to be furnished with a number of seed-chambers arranged and constructed in the usual manner, and furnished with brushes, which are represented by dotted lines in Fig. 1 at $v$.

The hopper $d$ is divided into three compartments, marked 1, 2, and 3. The seed is carried up out of the compartment marked 1 by the endless conveyer or belt $f$, and seed is carried down from the compartments 2 and 3 by the seed-drums $x$. It will be observed that by this arrangement three kinds of seed may be planted, each kind being deposited in the furrow in regular order.

B and B' are the ratchet-wheels. The ratchet-wheels B' are secured to the hub of the wheel $b'$, and the ratchet-wheels B move on eht shaft of the wheel $b'$, and are held into gear with the wheels B' by the spiral springs, marked A, which are kept from rubbing against the frame $a$ by means of collars C.

By the arrangement of the ratchet-wheels B, B', and $g$ the ratchet-pawl $h$ and the spiral spring A, in connection with the wheel $b'$, the planter is made inoperative when running backward, which is always necessary when turning the planter at the end of each row.

The operation of my invention is as follows: The different kinds of seed desired to be planted are put into the compartments 1, 2, and 3 of hopper $d$, the elevators or lifters on belt $f$ and the seed-chambers in the drum $s$ $x$ being arranged to suit the distance apart for the seed to be deposited. By drawing the planter forward the wheel $b'$ will cause the pulley $y$ and the drums $x$ to revolve. By means of the cranks $i$ and $j$ and the connecting-rods $k$ the revolving of pulley $y$ will cause the belt $f$ to move, thereby carrying the seed up out of the compartment 1 of the hopper $d$ to the place of deposit. The drums $x$ will carry the seed down from the compartments 2 and 3 to the place of deposit.

The planter is made inoperative in its back movement by the wheel $b'$ and the ratchet-wheels B', which are attached to the hub of wheel $b'$, revolving on their axes, which is held stationary by the ratchet-wheel $g$ and the ratchet-pawl $h$. (Seen in Fig. 1.)

The size of the various parts and manner or mode of constructing them is left to the good judgment of the mechanic.

Having thus described the nature, construc- tion, and operation of my improvement, what I claim as of my invention, and desire to secure by Letters Patent of the United States, is—

The combination and arrangement of the seed-drums $x$, elevators $e$ on the belt $f$, with the compartments 1, 2, and 3 of hopper $d$, the cranks $i$ and $j$, the connecting-rods $k$, the ratchet-wheels $g$, B, and B′, and the wheel $b'$, as herein described, and for the purpose set forth.

GEO. M. EVANS.

Witnesses:
GEORGE P. STECK,
JAMES J. JOHNSTON.